J. M. ROBERTS.
OVEN.
APPLICATION FILED JAN. 20, 1913.
1,088,628.
Patented Feb. 24, 1914.
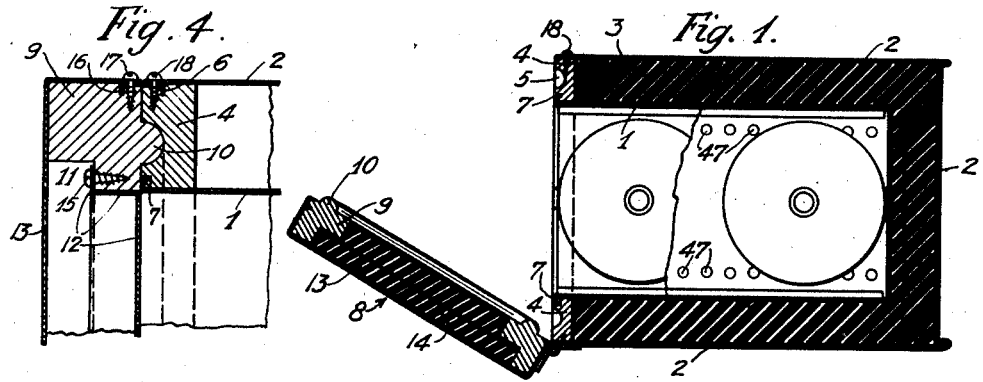
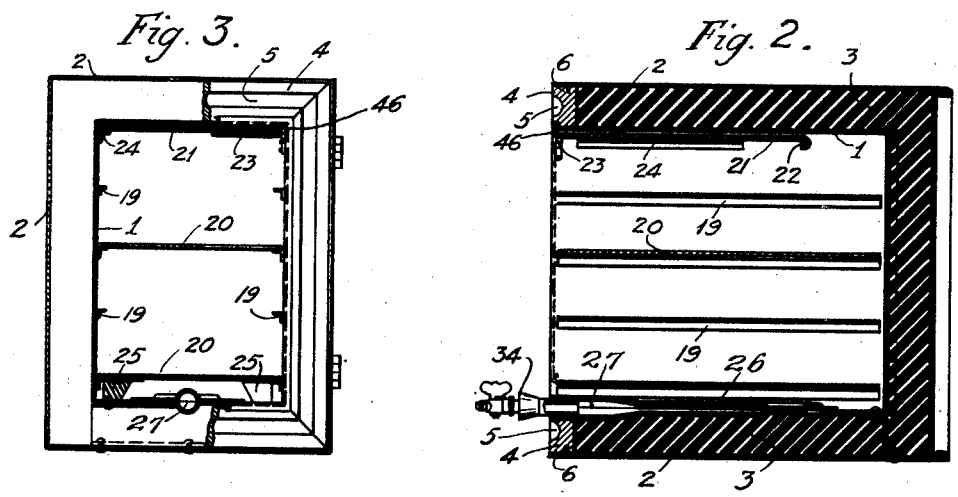
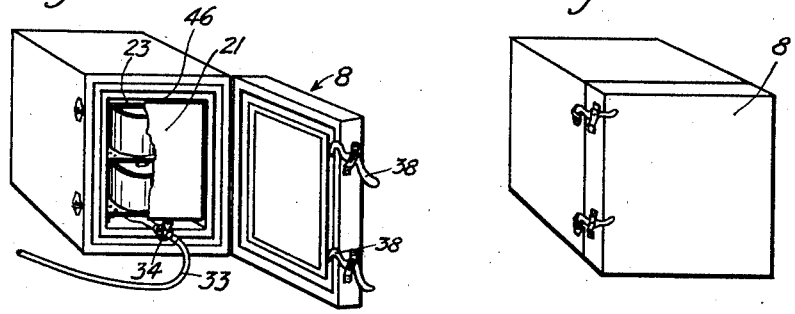
Witnesses:
Inventor:
Jesse M. Roberts
By H. A. Willson & Co
Attorneys

UNITED STATES PATENT OFFICE.

JESSE M. ROBERTS, OF LOS ANGELES, CALIFORNIA.

OVEN.

1,088,628. Specification of Letters Patent. Patented Feb. 24, 1914.

Application filed January 20, 1913. Serial No. 743,155.

*To all whom it may concern:*

Be it known that I, JESSE M. ROBERTS, a citizen of the United States, residing at Los Angeles, in the county of Los Angeles and State of California, have invented certain new and useful Improvements in Ovens; and I do declare the following to be a full, clear, and exact description of the invention, such as will enable others skilled in the art to which it appertains to make and use the same.

This invention relates to improvements in ovens.

One object of the invention is to provide an oven having insulated walls and a substantially air tight closure whereby heat will be retained in the oven for a considerable length of time after the heating medium has been removed or the heat turned off from the oven.

With this object in view, the invention consists of certain novel features of construction, and the combination and arrangement of parts as will be more fully described and claimed.

In the accompanying drawings; Figure 1 is a horizontal sectional view of my improved oven or cooker; Fig. 2 is a vertical longitudinal sectional view thereof; Fig. 3 is a front view of the oven with parts broken away and in section; Fig. 4 is an enlarged horizontal sectional view through one edge of the front end of the oven and the engaging edge of the main door; Fig. 5 is a perspective view of the oven showing the door thereof closed and fastened; Fig. 6 is a similar view showing the main door open and the fuel supply pipe connected with the oven.

My improved oven may be of any suitable size and shape and constructed of any suitable material, and preferably consists of an inner lining or walls 1 formed of aluminum and an outer casing or walls 2 which may be formed of wood, metal or other suitable material and which, in the present instance, are shown as being formed of sheet metal. The outer casing 2 is considerably larger than the inner lining or walls and thus forms a space between the inner and outer members of the oven. The space between said members is packed with a suitable insulating material 3 which is preferably diatomaceous silica, commonly called " sil-o-cel " which has been found by experience to be a suitable insulating or heat retaining medium. The front side of the inner lining or member of the oven is open and between the front edges of the inner lining and outer wall of the oven is a frame 4 which is preferably formed of wood and has in its outer surface a continuous groove 5 the purpose of which will be hereinafter described. The edges of the metal forming the outer walls of the oven are bent inwardly or folded against the inner side of the walls and said folded edges are then bent outwardly to form flanges or tongues 6 which are forced into or engaged with corresponding recesses or grooves in the outer edge of the frame 4. The outer edges of the inner lining or wall of the oven are bent outwardly at right angles over the outer side of the frame and then bent inwardly to form tongues or flanges 7 which are forced into or engaged with grooves or recesses in the outer side of the frame 4 as is clearly shown in Fig. 4 of the drawings.

The oven is provided with a main door 8 comprising a frame 9 of wood or other suitable material corresponding in shape to the frame 4 in the front end of the oven. On the inner side of the door frame 9 is formed a continuous bead or tongue 10 which is adapted to be engaged with the recess 5 in the frame 4. The inner edges of the frame are rabbeted as shown at 11 and with said rabbeted edge of the frame is engaged an inner lining or wall 12 which forms the inner side of the door. Secured to the outer edges of the door frame 9 is an outer sheet metal wall or covering 13 between which and the wall 12 is formed a space which is packed with insulating material 14 of the same character as that used in packing the walls of the oven. The edges of the inner wall of the door are secured to the frame 9 by screws 15 while the edges of the outer wall of the door are bent or folded back and then bent inwardly to form a flange or tongue 16 which is forced into the outer edge of the frame 9 of the door and said edge of the outer wall is further secured by a series of screws 17, similar screws 18 being engaged with the edge of the outer wall of the oven and with the outer side of the frame 4 thereof, whereby the tongue 6 of said outer wall is securely fastened in engagement with the frame 4.

Secured to the inner side of the side walls of the lining or member 1 of the oven are a series of longitudinal horizontally disposed cleats 19 with which are slidably engaged a series of shelves 20 adapted to support the cooking utensils placed in the oven. In addition to the main door 8 a supplemental drop door 21° is provided to retain the heat in the oven while the oven is being heated. The door 21 is here shown and is preferably in the form of a flat metal plate having on its upper edge an inwardly turned or hook shaped supporting flange 22. When in operative position the door 21 is adapted to be dropped down in front of the open end of the oven and to extend downwardly over or beyond the front edge of the lowermost shelf of the oven, said shelf being disposed a short distance above the bottom of the oven as shown. When the door 21 is in an operative position the hook shaped flange 22 on the upper edge thereof is adapted to engage or hook over a door supporting rod 23 which extends across the open front end of the oven a short distance below the top thereof as shown. When not in use the door 21 is swung outwardly at its lower end and pushed inwardly to a horizontal position immediately below the top of the oven opening in which position the door is slidably supported by cleats 24 secured to the sides of the inner wall of the oven as shown.

In the space between the lower shelf 20 and the bottom of the oven and adjacent to the side and end walls of said space are arranged fire bricks 25 by means of which the lining or inner wall of the oven around this space is protected from the intense heat of the burner with which the oven is provided. If desired, suitable heat retaining and radiating plates or bricks (not shown) may be provided for use in the oven. Arranged in the bottom of the oven is a burner 26 having a central fuel passage 27.

Fuel is supplied to the burner by a flexible fuel supply pipe 33 to which is secured an air mixer 34 which is here shown and is preferably in the form of a hollow body tapered from its outer toward its inner end and which is open at its inner end. In connecting the fuel supply pipe with the oven the tapered end of the air mixer is inserted in the outer end of the passage 27, said tapered mixer forming a gas tight engagement with said passage.

When it is desired to heat the oven the main door is opened and the supplemental door 21 is dropped down in front of the open end of the oven after which the air mixer on the end of the fuel supply pipe is passed under this door and inserted into the outer end of the burner and the gas turned on and lighted. When the oven has become sufficiently heated the gas is turned off and the air mixer and fuel pipe disconnected from the oven, after which the main door 8 is closed and securely fastened in closed position by suitable catches 38 which are here shown and are preferably in the form of hooks 38 adapted to engage keepers on the adjacent side of the oven as shown.

It will be noted that when the oven is being heated and the supplemental door 21 is in an operative position a space 46 is provided between the upper edge of the door 21 and the top of the oven whereby any fumes or impure air from the burning fuel will pass out of the oven. It will also be noted that the shelves 19 are provided with series of apertures 47 through which the heat is permitted to circulate in the oven.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined and claimed.

Having thus described my invention, what I claim is:

In an oven of the class described, the combination with a rectangular body having an open front, a main door hinged to said body and adapted to close the front air-tight, and a supplemental door slidably mounted on cleats and adapted to be housed within the oven body or withdrawn therefrom and supported in pendent position across the open front of the same, its lower edge then being spaced from the bottom; of a burner located in the bottom of the oven and having a fuel passage opening toward the front of such oven, a fuel conducting pipe, and a removable air mixer connected with said pipe and having a tapering end adapted to be passed under the lower edge of the pendent supplemental door and inserted into said fuel passage, for the purpose set forth.

In testimony whereof I have hereunto set my hand in presence of two subscribing witnesses.

JESSE M. ROBERTS.

Witnesses:
 HAZEL PIXLEY,
 BERTHA BATES.